(12) United States Patent
Song et al.

(10) Patent No.: US 11,557,804 B2
(45) Date of Patent: Jan. 17, 2023

(54) RECHARGEABLE BATTERY

(71) Applicant: Samsung SDI Co., Ltd., Yongin-si (KR)

(72) Inventors: Hyunhwa Song, Yongin-si (KR); Wonkyu Bang, Yongin-si (KR); Miyoung Son, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/347,984

(22) PCT Filed: Nov. 1, 2017

(86) PCT No.: PCT/KR2017/012243
§ 371 (c)(1),
(2) Date: May 7, 2019

(87) PCT Pub. No.: WO2018/084563
PCT Pub. Date: May 11, 2018

(65) Prior Publication Data
US 2019/0259981 A1 Aug. 22, 2019

(30) Foreign Application Priority Data
Nov. 7, 2016 (KR) .......................... 10-2016-0147507

(51) Int. Cl.
*H01M 10/0525* (2010.01)
*H01M 10/04* (2006.01)
(Continued)

(52) U.S. Cl.
CPC ..... *H01M 50/172* (2021.01); *H01M 10/0436* (2013.01); *H01M 10/0525* (2013.01); *H01M 50/116* (2021.01); *H01M 50/543* (2021.01)

(58) Field of Classification Search
CPC ...... H01M 2/06; H01M 2/021; H01M 2/2075; H01M 10/049; H01M 10/0477
See application file for complete search history.

(56) References Cited

U.S. PATENT DOCUMENTS 4,203,201 A * 5/1980 Mead .................. H01M 50/186
29/623.2
6,498,951 B1 * 12/2002 Larson ............... A61N 1/37512
607/36

(Continued)

FOREIGN PATENT DOCUMENTS

| CN | 1610166 A | 4/2005 |
|---|---|---|
| CN | 101350397 A | 1/2009 |

(Continued)

OTHER PUBLICATIONS

"Major arc" as defined by Wolfram MathWorld (accessed at https://mathworld.wolfram.com/MajorArc.html), accessed Feb. 11, 2022 (Year: 2022).*

(Continued)

*Primary Examiner* — Amanda J Barrow
(74) *Attorney, Agent, or Firm* — Lewis Roca Rothgerber Christie LLP

(57) ABSTRACT

A rechargeable battery according to an exemplary embodiment of the present invention may include an electrode assembly which can charge and discharge a current, a lead tab which is electrically connected to the electrode assembly, and a pouch case including an accommodation unit in which the electrode assembly is accommodated, and of which at least a portion of an edge side is formed to be curved, and a bonding unit which is formed to be extended from the edge side of the accommodation unit and seals the accommodation unit, wherein the bonding unit may include an upper bonding unit from which the lead tab is drawn out and a side bonding unit which is bent in a thickness direction of the (Continued)

accommodation unit and enables a support space to be formed between the side bonding unit and the accommodation unit.

13 Claims, 9 Drawing Sheets

(51) Int. Cl.
*H01M 50/172* (2021.01)
*H01M 50/116* (2021.01)
*H01M 50/543* (2021.01)

(56) References Cited

U.S. PATENT DOCUMENTS

| | | | |
|---|---|---|---|
| 2003/0183515 A1* | 10/2003 | Heller, Jr. | H01M 50/636 204/275.1 |
| 2005/0084749 A1 | 4/2005 | Hwang et al. | |
| 2007/0196732 A1* | 8/2007 | Tatebayashi | B60L 50/64 429/162 |
| 2009/0023058 A1 | 1/2009 | Kim | |
| 2009/0311592 A1 | 12/2009 | You et al. | |
| 2010/0003594 A1 | 1/2010 | Hong et al. | |
| 2011/0097615 A1 | 4/2011 | Goh et al. | |
| 2012/0015236 A1* | 1/2012 | Spare | H01M 50/543 429/162 |
| 2012/0244409 A1* | 9/2012 | Ok | H01M 50/109 429/130 |
| 2012/0270091 A1* | 10/2012 | Kuhn | H01M 50/54 429/153 |
| 2013/0084479 A1* | 4/2013 | Nonaka | H01M 10/0431 429/94 |
| 2013/0108906 A1* | 5/2013 | Bhardwaj | H01M 10/0459 429/94 |
| 2013/0230767 A1* | 9/2013 | Pak | H01M 2/0207 429/179 |
| 2013/0288104 A1* | 10/2013 | Kang | H01M 50/136 429/153 |
| 2014/0011070 A1* | 1/2014 | Kim | H01M 50/103 429/152 |
| 2014/0050959 A1 | 2/2014 | Ryu et al. | |
| 2015/0086842 A1* | 3/2015 | Kang | H01M 50/10 429/156 |
| 2015/0147626 A1* | 5/2015 | Tajima | H01M 50/437 429/139 |
| 2015/0288022 A1* | 10/2015 | Lee | H01M 10/0459 429/94 |
| 2015/0364729 A1 | 12/2015 | Jang | |
| 2016/0013459 A1* | 1/2016 | Suh | H01M 4/661 429/127 |
| 2016/0028047 A1* | 1/2016 | Park | H01M 10/4257 429/7 |
| 2016/0099454 A1* | 4/2016 | Kwon | H01M 50/557 429/159 |
| 2016/0197335 A1* | 7/2016 | Kim | H01M 50/528 429/179 |
| 2016/0308241 A1 | 10/2016 | Kim et al. | |
| 2017/0117508 A1* | 4/2017 | Kim | H01M 50/129 |
| 2019/0348718 A1* | 11/2019 | Kawai | H01M 50/531 |

FOREIGN PATENT DOCUMENTS

| | | |
|---|---|---|
| CN | 101971388 A | 2/2011 |
| CN | 103296231 A | 9/2013 |
| CN | 103947026 A | 7/2014 |
| CN | 104272492 A | 1/2015 |
| CN | 105280955 A | 1/2016 |
| CN | 105814730 A | 7/2016 |
| KR | 2003-0086069 A | 11/2003 |
| KR | 10-2010-0003557 A | 1/2010 |
| KR | 10-2013-0100701 A | 9/2013 |
| KR | 10-2014-0066047 A | 5/2014 |
| KR | 10-1402657 B1 | 6/2014 |
| KR | 10-2015-0076805 A | 7/2015 |
| KR | 10-2015-0096133 A | 8/2015 |
| KR | 10-2015-0113479 A | 10/2015 |
| KR | 10-1569452 B1 | 11/2015 |
| KR | 10-1595337 B1 | 2/2016 |
| KR | 10-2016-0076245 A | 6/2016 |
| KR | 10-2016-0115167 A | 10/2016 |

OTHER PUBLICATIONS

Chinese Office action dated Jul. 23, 2021 issued in CN Application No. 201780068707.8 with English translation, 15 pages.

Chinese Office action dated Apr. 18, 2022 issued in corresponding CN Application No. 201780068707.8, with English translation, 23 pages.

Chinese Notification of Grant Patent Right and Search Report issued in corresponding application No. CN 201780068707.8, dated Sep. 15, 2022 (incl English Translation of Notification of Grant Patent Right) 6 pages.

\* cited by examiner

RECHARGEABLE BATTERY

CROSS-REFERENCE TO RELATED APPLICATION(S)

This application is a National Phase Patent Application of International Patent Application Number PCT/KR2017/012243, filed on Nov. 1, 2017, which claims priority of Korean Patent Application No. 10-2016-0147507, filed Nov. 7, 2016. The entire contents of both of which are incorporated herein by reference.

TECHNICAL FIELD

The present invention relates to a rechargeable battery.

BACKGROUND ART

A rechargeable battery is a battery which can be charged and discharged, differently from a primary battery which is incapable of being charged. The rechargeable battery has been used in a portable small electronic device such as a mobile phone, a notebook, or a camcorder, or has widely been used as a power supply for driving a motor for a hybrid vehicle or the like.

The rechargeable battery includes an electrode assembly including a cathode and an anode, and a separator which is interposed between the cathode and the anode. The electrode assembly is accommodated in a case so as to perform charge and discharge, and the case includes a terminal to supply or receive current. The case may be formed of a metal plate or a pouch.

When it is used in a portable small electronic device, a rechargeable battery with various shapes corresponding to a size of a battery accommodating unit formed in the electronic device is required. Such a rechargeable battery requires a shape that can be more stably mounted inside the battery accommodating unit, and requires more improved capacity and more improved short-circuit preventing performance for stability of the rechargeable battery.

Such a rechargeable battery has a problem that there is a limitation in improving capacity of the rechargeable battery since it is inevitably formed in a curved shape, and creases are formed on a curved pouch case. Further, since an internal space of the battery accommodating unit is generally very small, a short circuit of the rechargeable battery may easily occur.

DISCLOSURE

Technical Problem

An exemplary embodiment of the present invention provides a rechargeable battery which can be more stably mounted in a battery accommodating space, and has more improved battery capacity and short-circuit preventing performance.

Technical Solution

A rechargeable battery according to an exemplary embodiment of the present invention may include an electrode assembly which can charge and discharge a current, a lead tab which is electrically connected to the electrode assembly, and a pouch case including an accommodation unit in which the electrode assembly is accommodated, and of which at least a portion of an edge side is formed to be curved, and a bonding unit which is formed to be extended from the edge side of the accommodation unit and seals the accommodation unit, wherein the bonding unit may include an upper bonding unit from which the lead tab is drawn out and a side bonding unit which is bent in a thickness direction of the accommodation unit and enables a support space to be formed between the side bonding unit and the accommodation unit.

The upper bonding unit may be formed in a direction perpendicular to a draw-out direction of the lead tab.

The support space may be formed in a range of 0.5 mm to 2 mm.

A rechargeable battery according to an exemplary embodiment of the present invention may additionally include an insulating member which has an empty space formed in an inner side thereof, and one side of which is opened such that the insulating member accommodates the pouch case in the inner side thereof and surrounds an outer side of the pouch case.

A rechargeable battery according to an exemplary embodiment of the present invention may additionally include an insulating protector which is formed along the side bonding unit and includes an insertion part inserted into and connected to the side bonding unit.

A rechargeable battery according to an exemplary embodiment of the present invention may additionally include an insulating cover which is connected to an inner side of the insulating protector and has a planar plate that covers the pouch case.

A method of manufacturing a rechargeable battery according to an exemplary embodiment of the present invention may include the steps of preparing a rechargeable battery including a pouch case including an accommodation unit in which an electrode assembly is accommodated, and of which at least a portion of an edge side is curved, and a side bonding unit which is formed to be extended from the edge side of the accommodation unit, the accommodation unit and the side bonding unit being formed in the pouch case, mounting the accommodation unit on an insertion part of a die, fixing the side bonding unit to a mounting part of the die, pressing between the insertion part and the mounting part of the side bonding unit using a punch, and cutting a bent end portion of the side bonding unit.

In the step of performing a pressing process using the punch, the punch can press the side bonding unit to a pressing groove formed around the insertion part.

In the step of fixing the side bonding unit, the side bonding unit can be fixed to the mounting part by pressurizing the side bonding unit using an outer stripper.

In the step of fixing the side bonding unit, the side bonding unit adjacent to the accommodation unit can be fixed by pressurizing the accommodation unit using an inner stripper.

The die may include a guide which is formed to a height that is the same as a thickness of the accommodation unit around the insertion part.

The guide may be formed in a thickness range of 0.5 mm to 2 mm.

The pressing groove may be formed to a smaller width than that of an inner side of the insertion part.

The punch may be formed such that the punch is protruded and tapered as the punch is closer to the insertion part.

Advantageous Effects

A rechargeable battery according to an exemplary embodiment of the present invention may be more stably

MODE FOR INVENTION

Figure 1:
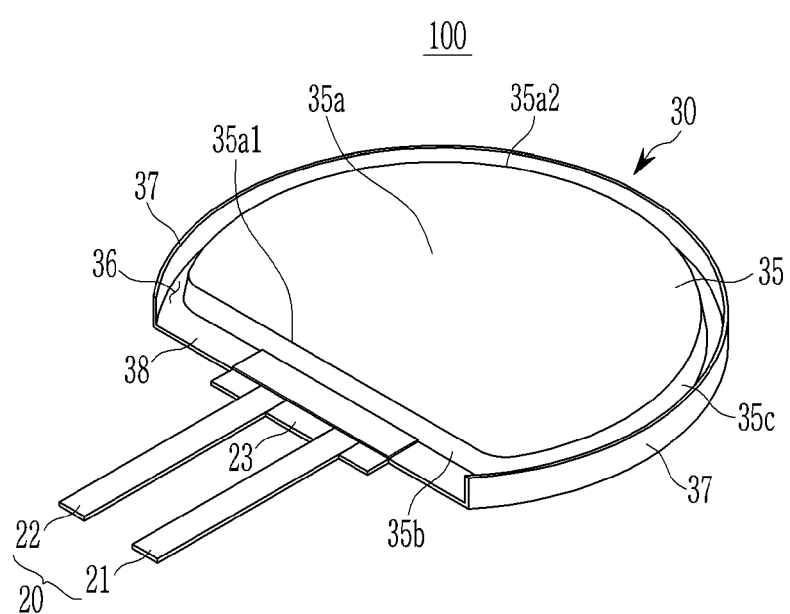
FIG. 1 is a perspective view showing a rechargeable battery according to an exemplary embodiment of the present invention.

Hereinafter, preferred embodiments of the present invention will be described in detail with reference to the annexed drawings so that those skilled in the art will easily be able to implement the present invention. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

It will be understood throughout the specification that when a part is referred to as being "connected with" another part, it can be "directly connected with" the other part or may be "indirectly connected with" the other part with part(s) interposed therebetween. Also, when a part is referred to as "including" an element, other elements may be further included unless there is any other particular mention on it.

Throughout the specification, it will be understood that when a part such as a layer, a film, a region, a plate, or the like is referred to as being 'above' or 'on' the other part, the terminology of 'above' and 'on' includes both the meanings of 'directly' and 'indirectly'. Furthermore, in the specification, the word "above" or "on" means positioning above or below the object portion, but does not essentially mean positioning on the upper side of the object portion based on a gravity direction.

Figure 2:
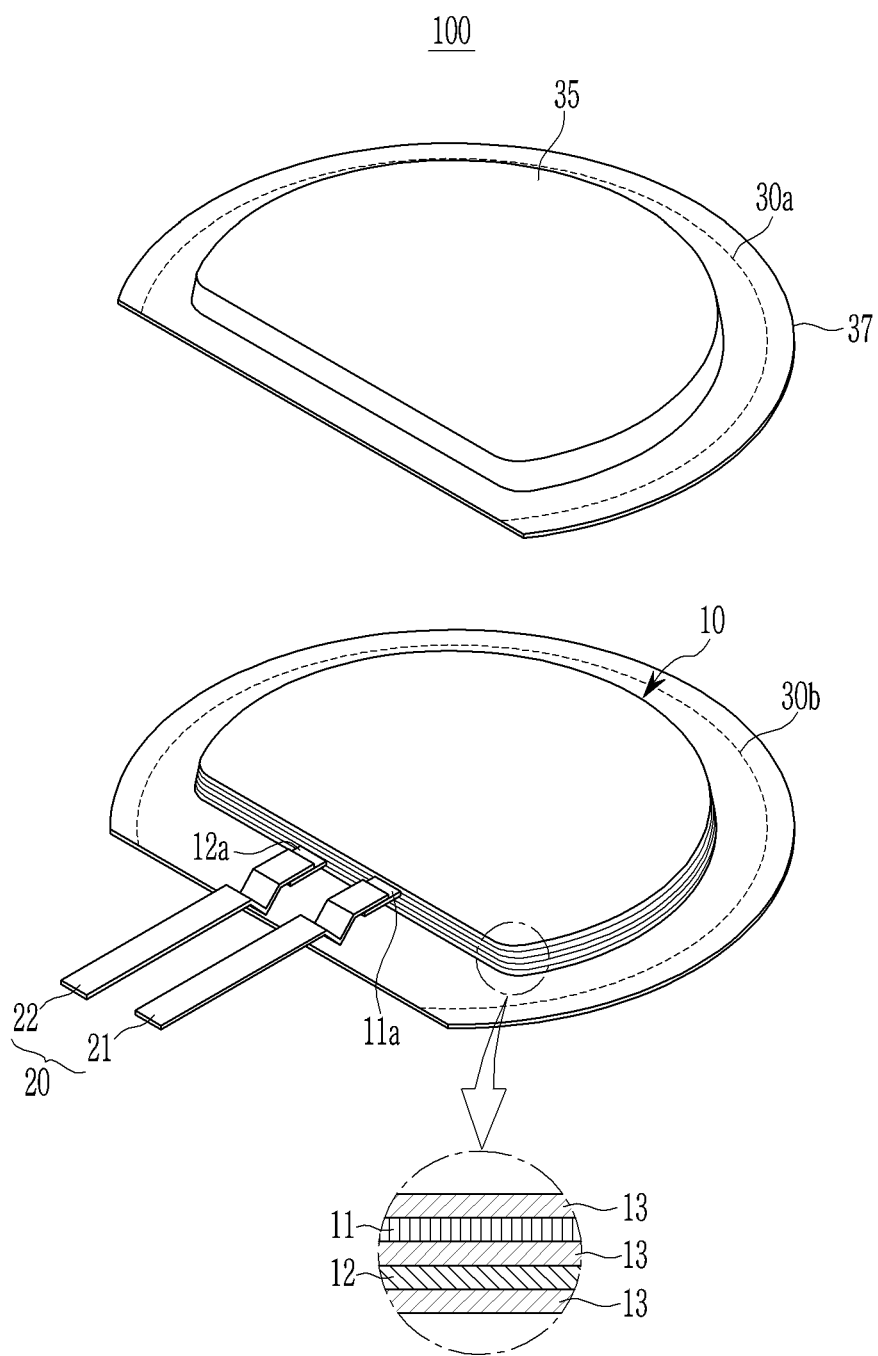
FIG. 2 is an exploded perspective view of the rechargeable battery illustrated in FIG. 1.

FIG. 1 is a perspective view showing a rechargeable battery according to an exemplary embodiment of the present invention, and FIG. 2 is an exploded perspective view of the rechargeable battery illustrated in FIG. 1.

Referring to FIG. 1 and FIG. 2, a rechargeable battery 100 may include a pouch case 30 which accommodates an electrode assembly 10, and a lead tab 20.

The electrode assembly 10 is formed by including a separator 13 which is interposed between a first electrode 11 and a second electrode 12. The electrode assembly 10 may be stacked.

The first electrode 11 may be a cathode or an anode, and the first electrode 11 as the cathode will be described as an example. The second electrode 12 may be formed in an opposite polarity to the first electrode 11. Hereinafter, the second electrode 12 as the anode will be described as an example.

The cathode 11 includes a cathode current collector which is formed of a strip-shaped metal thin plate and a cathode active material layer which is coated on one surface or both surfaces of the cathode current collector. The cathode current collector may be formed of a metallic material with excellent conductivity such as an aluminum thin plate. The cathode active material layer may be formed of a mixed material of a lithium-based oxide, a binder, a conductive material, and the like. The anode 12 includes an anode current collector which is formed of a strip-shaped metal thin plate, and an anode active material layer which is coated on one or both surfaces of the anode current collector. The anode current collector may be formed of a metallic material with excellent conductivity such as a copper thin plate. The anode active material layer may be formed of a mixed material of an anode active material such as a carbon material or the like, a binder, a conductive material, and the like. The separator 13 is formed of a porous material, and may be formed of a polyolefin, a polyethylene, a polypropylene, or the like.

The lead tab 20 may be electrically connected to the electrode assembly 10 by the medium of electrode tabs 11a and 12a. For example, the lead tab 20 includes a first lead tab 21 and a second lead tab 22. The first lead tab 21 may be connected to a first electrode tab 11a which is electrically connected to the first electrode 11 of the electrode assembly 10. As shown in FIG. 2, the first lead tab 21 may be bent at three locations along a length of the first lead tab 21. The second lead tab 22 may be connected to a second electrode tab 12a which is electrically connected to the second electrode 12 of the electrode assembly 10. As shown in FIG. 2, the second lead tab 22 may be bent at three locations along a length of the second lead tab 22.

The first lead tab 21 and the second lead tab 22 may be protruded to the outside of the pouch case 30. Particularly, the first lead tab 21 and second lead tab 22 have a protection tape 23 wound thereon. The protection tape 23 may prevent a short circuit with the pouch case 30.

The pouch case 30 may include an accommodation unit 35, and an upper bonding unit 38 and a side bonding unit 37 which are formed around the accommodation unit 35.

The pouch case 30 may be sealed by coupling of a first plate 30a and a second plate 30b. The first plate 30a and the second plate 30b of the pouch case 30 may be formed in a multi-layered sheet structure. For example, the pouch case 30 may be formed of a metal sheet or a polymer sheet. The polymer sheet forms an inner surface of a pouch to perform insulation and thermal fusion-bonding, and forms an outer surface of the pouch to perform a protection operation. For example, the polymer sheet may be a nylon sheet, a polyethylene terephthalate (PET) sheet, or a PET-nylon composite sheet. The metal sheet provides mechanical strength, and for example, the metal sheet may be an aluminum sheet.

The accommodation unit 35 accommodates the electrode assembly 10 and an electrolyte, and may be formed on either one of the first plate 30a and the second plate 30b of the pouch case 30. The accommodation unit 35 may have at least a portion of an edge side thereof formed to be curved.

For example, the accommodation unit 35 may be formed in various shapes according to a battery accommodating space formed in an electronic device. As shown in FIGS. 1 and 2, the accommodation unit 35 may have a planar face 35a having a symmetric shape with respect to an axis in a draw-out direction of a lead tab 20. The planar face 35a may have a straight side 35a1 and a curved side 35a2 with a straight wall 35b bent from the straight side 35a1 and a curved wall 35c bent from the curved side 35a2 such that the curved wall 35c extends along the curved side 35a2 from one end of the straight wall 35b to the other end of the straight wall 35b. For example, the side bonding unit 37 of the accommodation unit 35 may be formed in a shape such as a circular arc. As shown in FIGS. 1 and 2, the circular arc may be a major arc when viewed in a thickness direction of the accommodation unit 35. However, the side bonding unit 37 is not necessarily formed in a symmetrical shape, and may be diversely formed to be curved. However, the side bonding unit 37 may be bent without creases in a state that the side bonding unit 37 is separated from the accommodation unit 35. Accordingly, the rechargeable battery 100 can further improve capacity of the rechargeable battery 100 by enabling a size of the electrode assembly 10 to be secured as large as the side bonding unit 37 that is bent within a limited battery accommodating space of an electronic device, and can stably supply electricity to the electronic device by enabling the rechargeable battery 100 to be mounted in the limited battery accommodating space such that the rechargeable battery 100 is positioned within the accommodating space without shaking even when the electronic device is moved.

The upper bonding unit 38 may be formed on the top of the accommodation unit 35. The lead tab 20 which is electrically connected to the electrode assembly 10 through the upper bonding unit 38 is drawn out. For example, a width of the upper bonding unit 38 may be formed to be smaller than that of the side bonding unit 37. A width of the side bonding unit 37 may be formed to be larger than that of the upper bonding unit 38 since the side bonding unit 37 is bent in a state that the side bonding unit 37 is separated from the accommodation unit 35 of the pouch case 30, differently from the upper bonding unit 38.

The upper bonding unit 38 may be formed perpendicularly to a draw-out direction of the lead tab 20. For example, the upper bonding unit 38 may be linearly formed in a direction perpendicular to the draw-out direction of the lead tab 20. Through this, battery capacity can be improved by maximally reducing a terrace space (not shown) which is formed within the accommodation unit 35.

The side bonding unit 37 is extended from both sides of the upper bonding unit 38 and may be formed around the accommodation unit 35. The side bonding unit 37 is formed to be curved, and may be bent in a state that the side bonding unit 37 is separated from the accommodation unit 35. For example, the side bonding unit 37 is bent in a direction that is in parallel with a thickness direction of the accommodation unit 35, and the side bonding unit 37 is separated from the accommodation unit 35 such that a support space 36 may be formed between the accommodation unit 35 and the side bonding unit 37. Since the side bonding unit 37 is formed to have a longer length due to the formation of the support space 36, moisture that can penetrate into the pouch case 30 may be further reduced. Further, due to the support space 36, the rechargeable battery can be more effectively maintained in a curved shape for a long time.

In addition, a size of the side bonding unit 37 is reduced by bending the side bonding unit 37, and capacity of the rechargeable battery 100 can be improved by increasing an area of the electrode assembly 10 as large as a reduced area of the side bonding unit 37.

The support space 36 may be formed to a range of 0.5 mm to 2 mm between the accommodation unit 35 and an inner side of the bent side bonding unit 37. For example, when the support space 36 is formed to a width of no more than 0.5 mm, the electrode assembly 10 may be damaged in the process of bending the side bonding unit 37. In this case, an explosion risk of the rechargeable battery 100 is increased by damage to the electrode assembly 10. On the contrary, since a separation distance between the accommodation unit 35 and the side bonding unit 37 is large when the support space 36 is formed to a width of 2 mm or more, an effect of the support space 36 is reduced by half.

Figure 3:
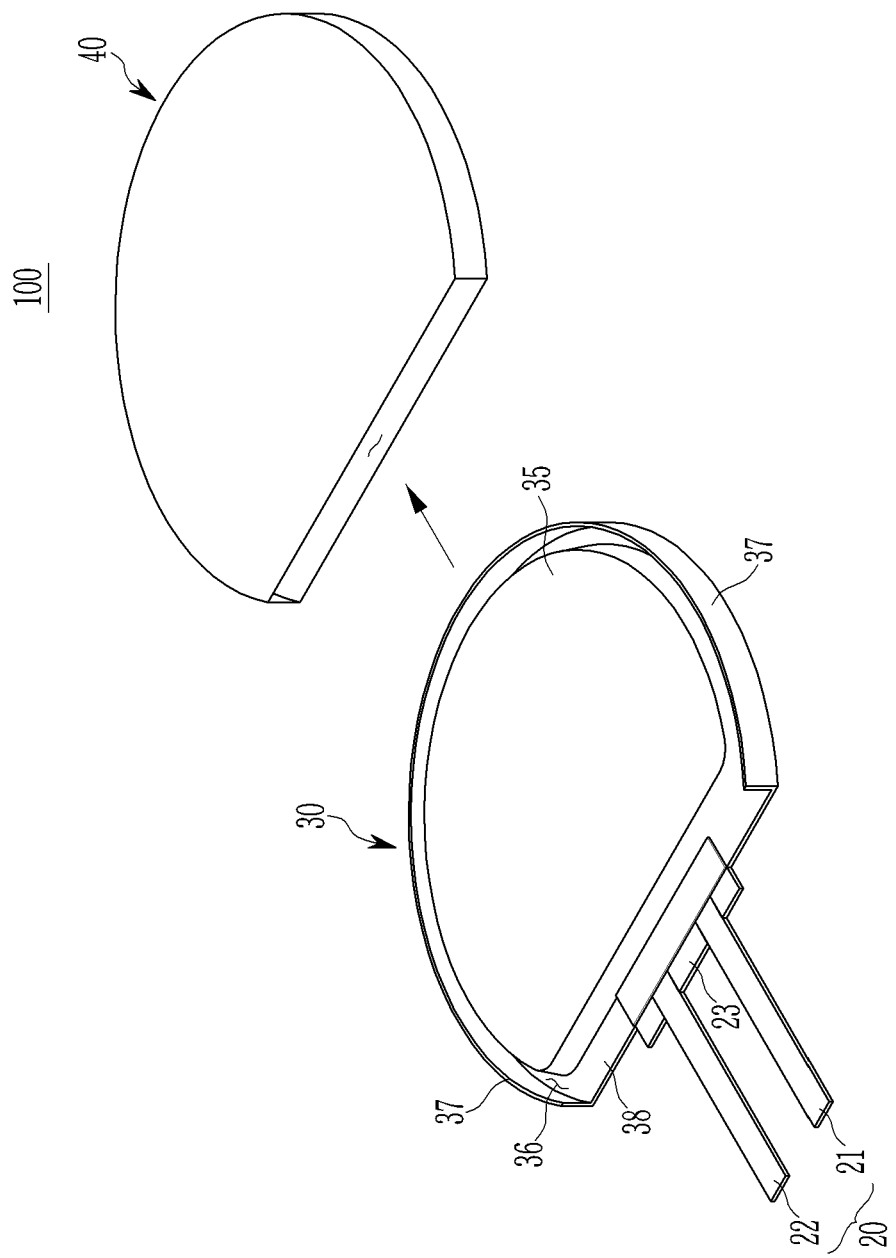
FIG. 3 is a perspective view showing an insulating member into which the rechargeable battery illustrated in FIG. 1 is inserted.
Figure 4:
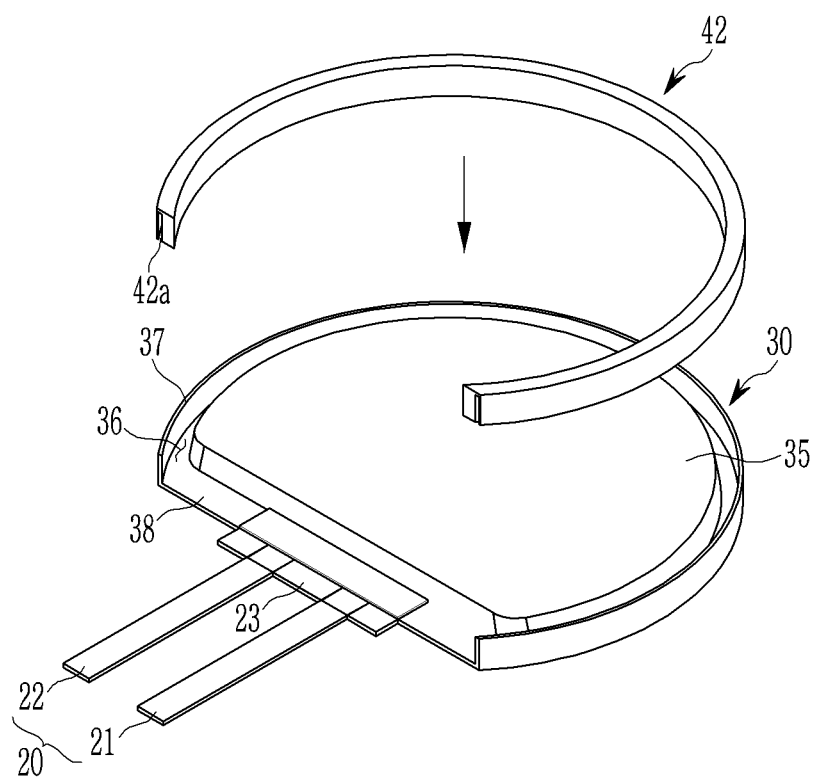
FIG. 4 is a perspective view showing an insulating protector coupled along an outer side of the rechargeable battery illustrated in FIG. 1.
Figure 5:
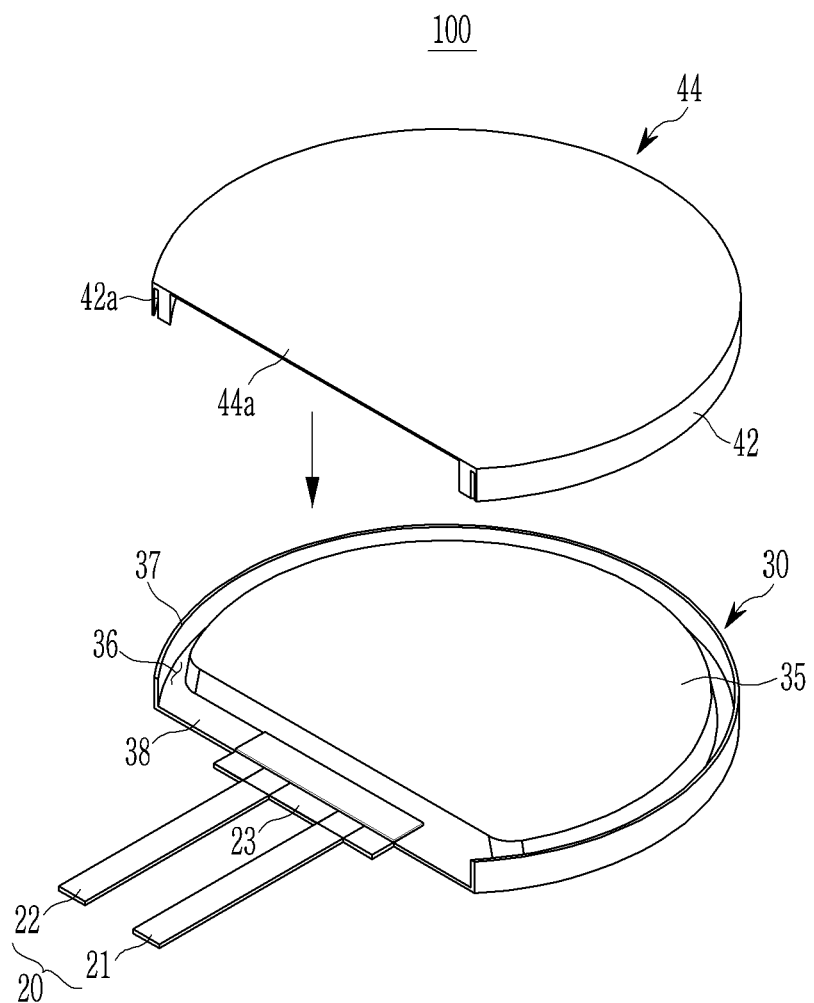
FIG. 5 is a perspective view showing an insulating cover coupled to the rechargeable battery illustrated in FIG. 1.
Figure 6:
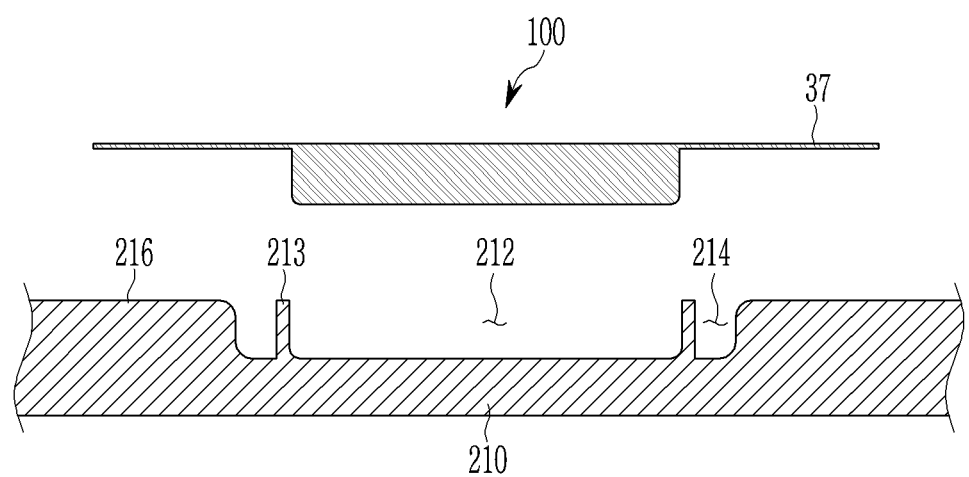
FIG. 6 to FIG. 9 are drawings showing the bending process of a rechargeable battery according to an exemplary embodiment of the present invention.
Figure 7:
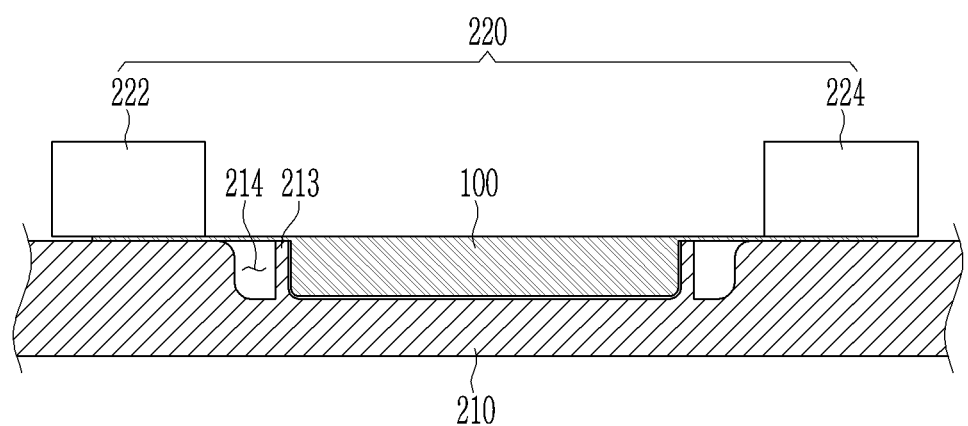
Figure 8:
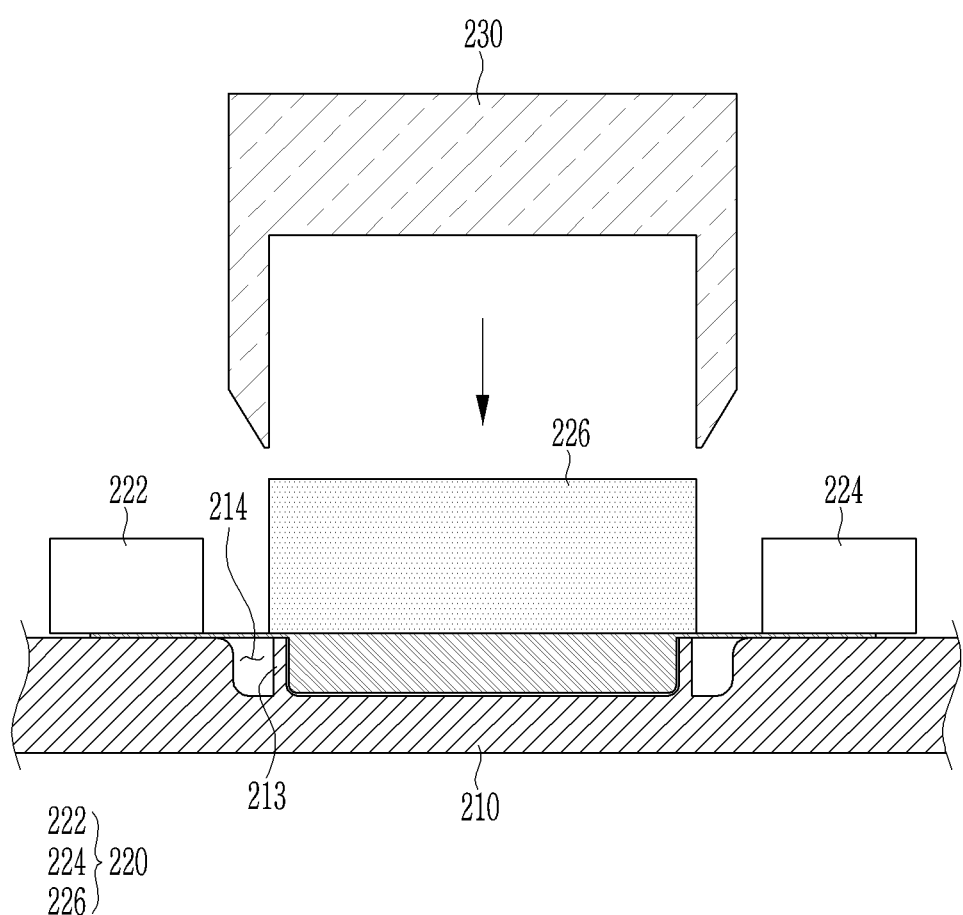
Figure 9:
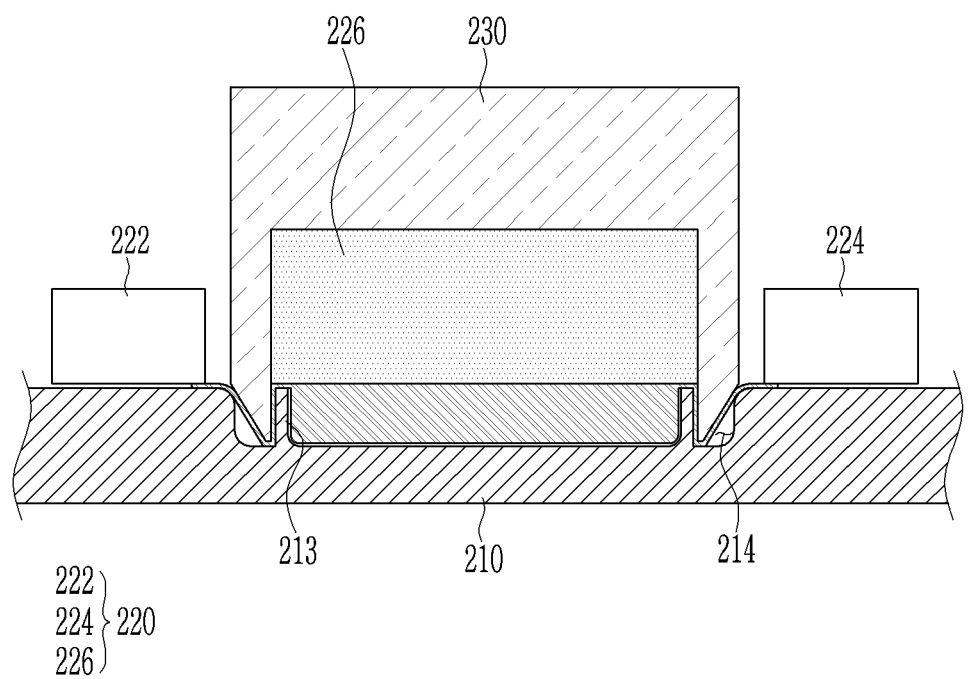

FIG. 3 is a perspective view showing an insulating member into which the rechargeable battery illustrated in FIG. 1 is inserted, FIG. 4 is a perspective view showing an insulating protector coupled along an outer side of the rechargeable battery illustrated in FIG. 1, and FIG. 5 is a perspective view showing an insulating cover coupled to the rechargeable battery illustrated in FIG. 1.

Referring to FIG. 3 to FIG. 5, an insulating member 40, an insulating protector 42, or an insulating cover 44 may be connected to an outer side of the pouch case 30.

The insulating member 40 has an empty space formed therein such that the pouch case 30 can be accommodated within the insulating member 40. For example, as shown in FIG. 3, the insulating member 40 may encapsulate the pouch case 30. The insulating member 40 has elasticity, and one side of the insulating member 40 is opened. For example, the rechargeable battery 100 is inserted into one side of the insulating member 40 such that the rechargeable battery 100 is positioned within the insulating member 40, and the lead tab 20 of the rechargeable battery 100 may be protruded to one side of the opened insulating member 40.

The insulating member 40 may be formed of polyvinyl chloride, a phenolic resin, and a silicone or synthetic rubber. Accordingly, external insulation of the pouch case 30 is possible, and the risk of a short circuit can be prevented. Further, durability of the rechargeable battery 100 can be improved by preventing corrosion of the pouch case 30. In addition, the support space 36 can be maintained by maintaining the side bonding unit 37 that has been bent in a state that the side bonding unit 37 is separated from the accommodation unit 35. As described above, the support space 36 is formed by the bent side bonding unit 37, and the rechargeable battery 100 can be protected by relieving an impact that may be applied from the outside through the support space 36.

The insulating protector 42 has an insertion part 42a formed therein such that the side bonding unit 37 can be inserted into the insertion part 42a. Further, the insulating protector 42 may be formed to be curved along the side bonding unit 37. Therefore, the bent side bonding unit 37 is inserted into the insertion part 42a of the insulating protector 42 such that one side of the insulating protector 42 is positioned in the support space 36, and the other side of the insulating protector 42 is positioned on an outer circumferential surface of the bent side bonding unit 37.

Through this, the insulating protector 42 surrounds and insulates the bent side bonding unit 37, and can prevent corrosion of the side bonding unit 37. In addition, the support space 36 which is formed by bending the side bonding unit 37 may be maintained. For example, the insulating protector 42 may be manufactured of an injection-molded product obtained by performing a plastic injection molding process.

The insulating cover 44 may additionally include a planar plate 44a which is formed on an inner side of the insulating protector 42 and covers the accommodation unit 35 of the pouch case 30. For example, the insulating cover 44 is connected to one side and a side surface of the pouch case 30 to insulate the pouch case 30 and prevent corrosion of the pouch case 30, and the insulating cover 44 can assist the pouch case 30 to enable the support space 36 formed by the bent side bonding unit 37 to be maintained.

As described above, durability of the rechargeable battery 100 is improved, and insulation and corrosion risks of the pouch case 30 can be reduced by relieving damage to the electrode assembly 10 by an impact applied from the outside through a configuration of the insulating member 40, insulating protector 42, or insulating cover 44. Further, an effect of reducing an impact by maintaining the support space 36 can be improved.

FIG. 6 to FIG. 9 are drawings showing the bending process of a rechargeable battery according to an exemplary embodiment of the present invention.

Referring to FIG. 2 and FIGS. 6 to 9, a method of manufacturing a rechargeable battery 100 may first include the step of preparing a rechargeable battery 100 including an accommodation unit 35 in which an electrode assembly 10 is embedded and a pouch case 30 in which a curved side bonding unit 37 is formed.

A lead tab 20 is drawn out from an accommodation unit 35, and an upper bonding unit 38 may be linearly formed in a direction perpendicular to a draw-out direction of the lead tab 20. A terrace space (not shown) to which electrode tabs 11a and 12a protruded from the lead tab 20 and the electrode assembly 10 are connected may be formed in an inner side of the upper bonding unit 38. The side bonding unit 37 may be formed to be curved in a state that the side bonding unit 37 is connected to the upper bonding unit 38. The side bonding unit 37 may be formed in a side surface of the accommodation unit 35. The side bonding unit 37 may be more greatly separated from the accommodation unit 35 than the upper bonding unit 38.

Next, the method may include the step of mounting the accommodation unit 35 on an insertion part 212 of a die 210. In order to bend the side bonding unit 37 that has been formed to be curved, the insertion part 212 is formed in the die 210, and the accommodation unit 35 is mounted on the insertion part 212. Through this, even when the side bonding unit 37 is pressurized by a punch 230, the side bonding unit 37 may prevent the accommodation unit 35 from being moved. The insertion part 212 may be formed along the shape of the accommodation unit 35. That is, an opening for the lead tab 20 protruded from the accommodation unit 35 may be formed in one surface of the insertion part 212.

Next, the method may include the step of fixing the side bonding unit 37 to a mounting part 216 of the die 210. When the side bonding unit 37 is not fixed, creases may be formed on the bent side bonding unit 37. That is, the side bonding unit 37 is fixed to the mounting part 216 formed in the die 210 to prevent the creases from being formed and bend the side bonding unit 37.

The mounting part 216 is formed to be separated from the insertion part 212. The mounting part 216 and the insertion part 212 may have a pressing groove 214 formed therebetween. For example, the die 210 has the insertion part 212 formed therein such that the accommodation unit 35 is mounted on the insertion part 212, and the insertion part 212 may be formed to be recessed in the surface of the die 210. The pressing groove 214 may be formed around the insertion part 212. The insertion part 212 and the pressing groove 214 may be formed such that depths of the insertion part 212 and the pressing groove 214 measured from the surface of the die 210 are equal to each other. The insertion part 212 and the pressing groove 214 may be divided by a guide 213 formed around the insertion part 212. The guide 213 may be formed to a thickness range of 0.5 mm to 2 mm. The mounting part 216 may be formed in the die 210 around the pressing groove 214.

A stripper 220 includes an outer stripper 222 and an inner stripper 226. The outer stripper 222 can fix the side bonding unit 37 while pressing the side bonding unit 37 mounted on the mounting part 216. The inner stripper 226 can fix the rechargeable battery 100 while pressing the accommodation unit 35.

Next, the method may include the step of pressing a space between the insertion part 212 and the mounting part 216 of the side bonding unit 37 using the punch 230.

The side bonding unit 37 may be extended while it is being pressed by the punch 230. For example, the side bonding unit 37 is fixed by the outer stripper 222, and when the punch 230 presses a space between the mounting part 216 and the insertion part 212, the side bonding unit 37 is extended along the shape of the punch 230 while the side bonding unit 37 is closely adhered to the guide 213 surrounding a side surface of the insertion part 212. At this time, the punch 230 may be formed to be protruded and tapered as the punch 230 becomes close to the insertion part 212. Therefore, the extended side bonding unit 37 is connected to the mounting part 216 along the tapered punch 230.

When bending the side bonding unit 37, creases may be formed on an outer circumferential surface of the side bonding unit 37 as the length of the side bonding unit 37 is reduced. Therefore, when closely adhering the side bonding unit 37 to the guide 213 while extending the side bonding unit 37 by pressurizing the side bonding unit 37 using the punch 230, there is an effect that creases are not formed on the side bonding unit 37. The punch 230 may have a space formed therein such that the inner stripper 226 can be inserted into the punch 230.

Next, the method may include the step of cutting an end portion of the side bonding unit 37 which is bent after it has been closely adhered to the insertion part 212. A shape of the side bonding unit 37 which is extended and pressurized by the punch 230 is formed according to a shape of the punch 230. Therefore, the extended side bonding unit 37 is cut and removed except for the side bonding unit 37 which has been closely adhered to the guide 213, and then bent in a thickness direction of the accommodation unit 35. Through this, the side bonding unit 37 can be bent such that the side bonding unit 37 is formed to be curved around the accommodation unit 35 without forming the creases, and enables the support space 36 to be formed in a state that the support space 36 is separated from the accommodation unit 35.

Although the present invention has been described through preferred embodiments as described above, the present invention is not limited thereto, and it will be easily understood by those skilled in the art that the present invention may be diversely modified and changed so long as it does not deviate from the concept and scope of patent claims described below.

| | |
|---|---|
| 100: Rechargeable battery | 10: Electrode assembly |
| 11: First electrode | 12: Second electrode |
| 11a: First electrode tab | 12a: Second electrode tab |
| 13: Separator | 20: Lead tab |
| 21: First lead tab | 22: Second lead tab |
| 23: Protection tape | 30: Pouch case |
| 35: Accommodation unit | 36: Support space |
| 37: Side bonding unit | 38: Upper bonding unit |
| 40: Insulating member | |
| 42: Insulating protector | 42a: Insertion part |

-continued

| | |
|---|---|
| 44: Insulating cover | 44a: Planar plate |
| 210: Die | 212: Insertion part |
| 213: Guide | 214: Pressing groove |
| 216: Mounting part | 220: Stripper |
| 222: Outer stripper | 226: Inner stripper |
| 230: Punch | |

The invention claimed is:

1. A rechargeable battery including:
an electrode assembly which can charge and discharge a current;
a lead tab which is electrically connected to the electrode assembly; and
a pouch case including an accommodation unit in which the electrode assembly is accommodated, the accommodation unit comprising a planar face having a straight side and a curved side, the planar face being symmetric with respect to an axis in a draw-out direction of the lead tab that is parallel to the planar face, a straight wall bent from the straight side, and a curved wall bent from the curved side, the curved wall extending along the curved side from one end of the straight wall to another end of the straight wall, and a bonding unit which is formed to be extended from the straight wall and the curved wall of the accommodation unit and seals the accommodation unit,
wherein the bonding unit includes an upper bonding unit from which the lead tab is drawn out and a side bonding unit which is bent in a thickness direction of the accommodation unit and enables a support space to be formed between the side bonding unit and the accommodation unit,
wherein the side bonding unit is formed to be curved along the curved wall and is bent without creases, and
wherein the lead tab is bent at three locations along a length of the lead tab.

2. The rechargeable battery of claim 1, wherein the upper bonding unit is formed in a direction perpendicular to the draw-out direction of the lead tab.

3. The rechargeable battery of claim 1, wherein the support space is formed in a range of 0.5 mm to 2 mm.

4. The rechargeable battery of claim 1, additionally including an insulating protector which is formed along the side bonding unit and includes an insertion part inserted into and connected to the side bonding unit.

5. The rechargeable battery of claim 4, additionally including an insulating cover which is connected to an inner side of the insulating protector and has a planar plate that covers the pouch case.

6. A rechargeable battery including:
an electrode assembly which can charge and discharge a current;
a lead tab which is electrically connected to the electrode assembly; and
a pouch case including an accommodation unit in which the electrode assembly is accommodated, the accommodation unit comprising a planar face having a straight side and a curved side, the planar face being symmetric with respect to an axis in a draw-out direction of the lead tab that is parallel to the planar face, a straight wall bent from the straight side, and a curved wall bent from the curved side, the curved wall extending along the curved side from one end of the straight wall to another end of the straight wall, and a bonding unit which is formed to be extended from the straight wall and the curved wall of the accommodation unit and seals the accommodation unit,
an insulating member which has an empty space formed in an inner side thereof, and one side of which is opened such that the insulating member encapsulates the pouch case,
wherein the bonding unit includes an upper bonding unit from which the lead tab is drawn out and a side bonding unit which is bent in a thickness direction of the accommodation unit and enables a support space to be formed between the side bonding unit and the accommodation unit,
wherein the lead tab protrudes to the one side of the insulating member, and
wherein the lead tab is bent at three locations along a length of the lead tab.

7. A rechargeable battery comprising:
an electrode assembly configured to charge and discharge a current;
a lead tab electrically connected to the electrode assembly; and
a pouch case comprising an accommodation unit, in which the electrode assembly is accommodated, the accommodation unit comprising a planar face having a straight side and a curved side, the planar face being symmetric with respect to an axis in a draw-out direction of the lead tab that is parallel to the planar face, a straight wall bent from the straight side, and a curved wall bent from the curved side, the curved wall extending along the curved side from one end of the straight wall to another end of the straight wall, and a bonding unit sealing the accommodation unit,
wherein the bonding unit comprises an upper bonding unit from which the lead tab is drawn out and a curved side bonding unit bent in a thickness direction of the accommodation unit and facing the curved wall of the accommodation unit to form a support space between the curved side bonding unit and the curved wall of the accommodation unit,
wherein the curved side bonding unit is formed to be curved along the curved wall and is bent without creases, and
wherein the lead tab is bent at three locations along a length of the lead tab.

8. The rechargeable battery of claim 7, wherein the upper bonding unit is formed in a direction perpendicular to the draw-out direction of the lead tab.

9. The rechargeable battery of claim 7, wherein the support space is formed in a range of 0.5 mm to 2 mm.

10. The rechargeable battery of claim 7, further comprising an insulating member having an empty space formed in an inner side thereof, and one side of which is opened such that the insulating member accommodates the pouch case and the electrode assembly in the inner side thereof and surrounds an outer side of the pouch case.

11. The rechargeable battery of claim 7, further comprising an insulating protector which is formed along the curved side bonding unit and includes an insertion part inserted into and connected to the curved side bonding unit.

12. The rechargeable battery of claim 11, further comprising an insulating cover which is connected to an inner side of the insulating protector and has a planar plate that covers the pouch case.

13. The rechargeable battery of claim 10, wherein the insulating member is elastic and comprises a polyvinyl chloride, a phenolic resin, a silicone rubber, or a synthetic rubber.

* * * * *